Oct. 28, 1930.   I. SHAFER   1,779,857

SAW

Filed June 24, 1929

INVENTOR.
Ira Shafer
BY A. B. Bowman
ATTORNEY

Patented Oct. 28, 1930

1,779,857

UNITED STATES PATENT OFFICE

IRA SHAFER, OF SAN DIEGO, CALIFORNIA

SAW

Application filed June 24, 1929. Serial No. 373,185.

My invention relates to saws, and the objects of my invention are: first, to provide a saw which is especially adapted for small work; second, to provide a saw which may be made as a hack saw, coping saw, or keyhole saw; third, to provide a saw of this class which does not straddle the work, thereby facilitating its operation; fourth, to provide a saw of this class which may be readily used in awkward or unhandy places; fifth, to provide a saw of this class in which the major portion of the saw blade is sheathed when not in use, thereby greatly reducing the likelihood of damage to the blade or injury to a person handling the saw; sixth, to provide a saw of this class in which the saw blade may be readily removed or replaced; seventh, to provide a saw of this class which may be readily operated with one hand, leaving the other hand free for holding the work or the like; eighth, to provide a saw of this class which permits use of the saw blade fully to its extended end, thus when a hack saw blade is used, delicate sawing may be accomplished which is impossible with the conventional hack saw supported at both its ends; and ninth, to provide on a whole, a novelly constructed saw, which is extremely simple and economical of construction, durable, efficient in its action and which will not readily deteriorate or get out of order.

Figure 1:
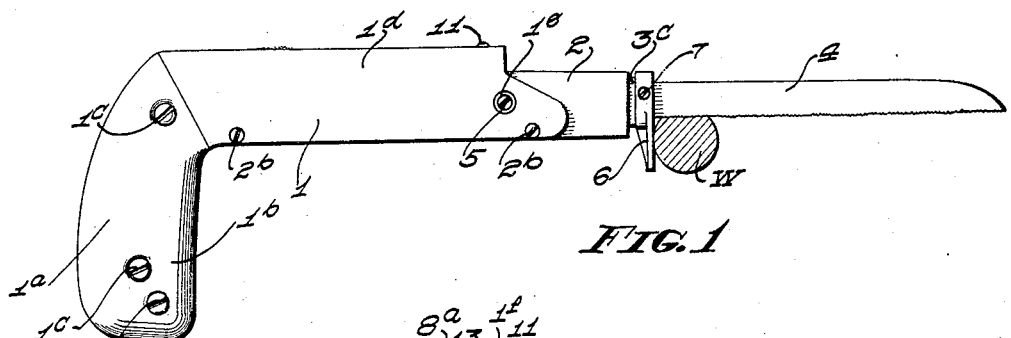
Figure 2:
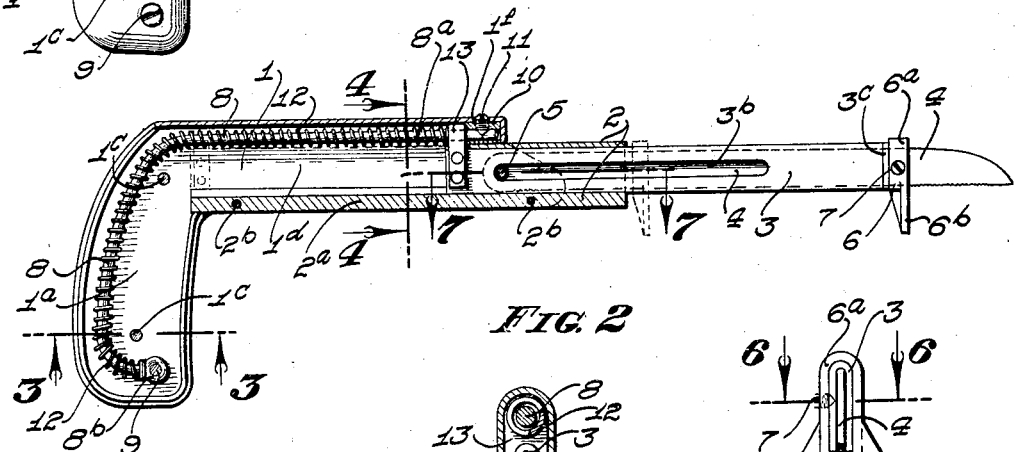
Figure 4:
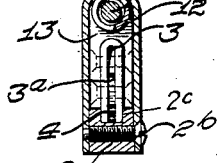
Figure 5:
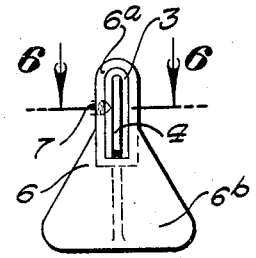
Figure 3:
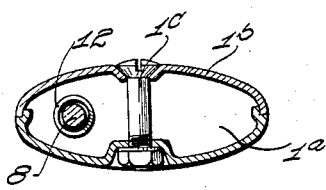
Figure 6:
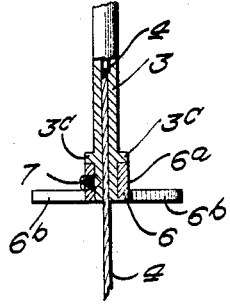
Figure 7:
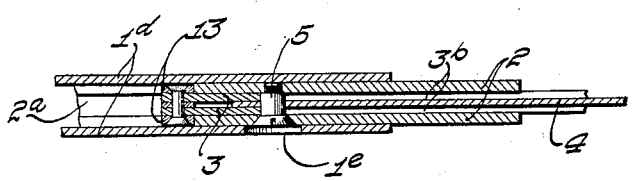

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side elevational view of my hack saw, with the hack saw blade sheath in its retracted position; Fig. 2 is a similar view with the hack saw blade sheath in its extended position, and with parts and portions in section to facilitate the illustration; Fig. 3 is an enlarged transverse sectional view of the handle taken through 3—3 of Fig. 2; Fig. 4 is another enlarged sectional view through 4—4 of Fig. 2; Fig. 5 is an enlarged end elevational view of my saw, showing the saw blade and its sheath and sheath shifting member; Fig. 6 is an enlarged sectional view thereof through 6—6 of Fig. 5; and Fig. 7 is another enlarged sectional view through 7—7 of Fig. 2.

Similar characters of reference refer to similar parts and portions throughout the several views of the drawings.

Casing 1, sleeve member 2, saw blade sheath 3, saw blade 4, screw member 5, sheath shifting member 6, set screw 7, rod 8, anchor screw 9, end member 10, set screw 11, spring 12, and traveler member 13, constitute the principal parts and portions of my saw.

The casing 1 is formed of sheet material substantially L-shaped in outline, with the one arm thereof extending downwardly and forming a handle $1^a$. The handle $1^a$ is hollow, has substantially the outline of a pistol grip, and may be formed elliptical in cross section, as shown in Fig. 3. If desired, the handle may be split, and one of the members thus formed may constitute a cover $1^b$, as shown in Figs. 1 and 3, secured to the other member of the handle by suitable screws $1^c$. The other arm $1^d$ of the casing is formed by folding the material along its upper side so that it is substantially U-shaped in cross section, leaving the bottom side open.

A sleeve member 2 is provided which is substantially rectangular in cross section and fits between the side walls of the casing 1 at the extended end thereof and protrudes therefrom, as shown best in Figs. 2, 4 and 7.

The lower side $2^a$ of the sleeve member 2 is substantially thicker than the other sides thereof, and extends rearwardly of said sleeve member and closes the open under side of the arm $1^d$. A track in the form of a channel $2^c$ is formed in this lower side $2^a$ by extending the lower margins of the side walls of said sleeve member rearwardly with the lower or base side $2^a$. Screws $2^b$ extend transversely through the lower or base side $2^a$ and secure the sleeve 2 relative to the arm $1^d$.

A saw blade sheath 3 is provided which is adapted to telescope within the sleeve member 2. The sheath 3 is formed by bending a piece of sheet material against itself, leaving a deep narrow slit $3^a$ between the sides. The sheath is positioned in the sleeve member with the opening of the slit $3^a$ facing towards the bottom. The slit $3^a$ is formed wide enough and deep enough to receive a saw blade, in this case, a hack saw blade 4.

The sheath 3 is adapted to reciprocate within the sleeve member 2, but the saw blade 4 is held stationary relative to said sleeve member. This is accomplished by a screw member 5 which extends transversely through the sleeve member 2 and through a hole in the one end of the saw blade 4, there being provided slots $3^b$ in the side walls of the saw blade sheath 3, so that the movement of the saw blade sheath is made possible.

As the casing 1 extends over the screw or pin 5, said casing is provided with an opening $1^e$ therein, which permits access to the screw 5 without removing the sleeve 2 from the casing.

The extended end of the saw blade sheath 3 is provided with a shifting member 6, which consists of a loop portion $6^a$ adapted to fit over the end of the sheath and abut against ridges $3^c$ formed on the outer surfaces of the sheath adjacent the end thereof. A depending portion $6^b$ extends down from the loop portion $6^a$ and is adapted to engage the work operated upon by the saw, as shown in Fig. 1, so that when the saw is pushed across the work, the shifting member causes the sleeve 3 to telescope within the sleeve and expose the blade, shown by the dotted lines in Fig. 2 and solid lines in Fig. 1. A suitable set screw 7 holds the shifting member in place, and yet permits the shifting member to be readily removed so that another one may be placed thereon if it should be desired to do so.

A straight portion $8^a$ of the rod 8 extends along the inside of the arm $1^d$ of the casing 1 adjacent to the upper side thereof, and in spaced parallel relation to the extended portion of the bottom side $2^a$ of the sleeve 2. The rod 8 upon reaching the handle portion of the casing curves downwardly, making a relatively gradual turn, then extends into the handle to the bottom thereof where it terminates in a loop portion $8^b$. The loop portion $8^b$ is secured in the handle by means of an anchor screw 9 which extends transversely through said handle, as shown in Figs. 1 and 2.

The extended end straight portion $8^a$ of the rod, within the arm $1^d$ of the casing, is provided with an end member 10 which fits within the casing at the extended upper end thereof and is adapted to receive a set screw 11 for holding the rod 8. Said set screw extends upwardly through an opening $1^f$ in the upper side of the casing leg $1^d$, so as to hold the rod in firm relation relative to the casing.

A spring 12 is coiled around the rod 8, the full length thereof, the one end of said spring bearing against the loop portion $8^b$, and the other end of said spring bearing against a traveler member 13. Said traveler member is adapted to reciprocate on the straight portion $8^a$ of the rod 8 and is normally held against the end member 10 by the action of the spring 12. The traveler member 13 extends downwardly from the rod 8 and is secured to the inner end of the saw blade sheath 3, as shown best in Figs. 2 and 4.

The channel $2^b$ formed in the extended portion of the lower side $2^a$ of the sleeve 2 functions as a guide for the sheath 3.

The operation of my saw is as follows:

The sheath 3 is resiliently held by the spring 12 in the position shown by solid lines in Fig. 2. The sheath shifting member 6 is placed against the work to be operated upon, then the handle $1^a$ is pushed towards the work, causing the saw blade to move across the work and shifting the sheath from the position shown by solid lines to that shown by dotted lines in Fig. 2. This movement of the sheath is against the action of the spring 12. Release of pressure upon the handle $1^a$ automatically causes the sheath to extend again, drawing the blade back across the work ready for another stroke.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a saw, a hollow casing comprising a pistol grip handle and a hollow arm extending therefrom said arm having an enlarged rear portion and a downwardly stepped front portion, a guide rod mounted in said casing comprising a substantially straight portion extending into said enlarged rear portion, and a curved portion extending into the handle of said casing, a saw blade supported by the stepped portion of said arm and extending therefrom, a sheath for said saw blade, said sheath forming a sliding fit within said stepped portion adapted to telescope within the arm of said casing and reciprocate upon said rod, and a spring coiled upon said rod adapted to yieldably hold said sheath in the extended position so as to substantially enclose said saw blade.

2. In a saw, a hollow casing comprising a pistol grip handle and a hollow arm extending therefrom, said arm having an enlarged rear portion and a downwardly stepped front portion, a guide rod mounted in said casing comprising a substantially straight portion extending into the arm of said casing, and a curved portion extending into the handle of said casing, a saw blade supported by said stepped arm portion and extending therefrom, a sheath for said saw blade, forming a sliding fit within said stepped portion and having an inner end portion having an aperture for receiving said rod, said sheath adapted to telescope within the arm of said casing and reciprocate upon said rod, a spring coiled upon said rod adapted to engage said inner end portion and yieldably hold said sheath in the extended position so as to substantially enclose said saw blade.

3. In a saw, a casing comprising a hollow pistol grip handle, a hollow arm extending therefrom, said arm having a restricted outer portion forming a step in the upper wall of said arm, a rod extending within said casing from said step adjacent the upper wall of said arm to the butt end of said grip, a helical spring positioned around said rod substantially over its entire length, a saw blade secured at its one end within said restricted arm portion, a sheath enveloping the sides of said saw and slidable thereover and within said restricted arm portion, an upwardly extending portion on the inner end of said sheath having an aperture for receiving said rod and abutting the contiguous end convolution of said spring, said sheath adapted to telescope within the entire length of said arm against the tension of said spring and to be yieldably held in extended position by said spring.

4. In a saw, a casing comprising a handle portion and a hollow arm extending therefrom, a saw blade extending into the outer end portion of said arm, a pin extending through said blade into adjacent walls of said arm, a substantially inverted U-shaped sheath positioned over said blade and slidable within said arm, longitudinal slots in the sides of said sheath for permitting reciprocal movement of said sheath over said pin, resilient means in engagement with said sheath for yieldably holding said sheath in extended position, and means extending downwardly on the outer end of said sheath for engaging the work being cut and for shifting said sheath into said arm.

In testimony whereof, I have hereunto set my hand at San Diego, California this 12th day of June 1929.

IRA SHAFER.